(12) United States Patent
Cotter (10) Patent No.: US 7,870,832 B2
(45) Date of Patent: Jan. 18, 2011

(54) PRESSURE INDICATING DEVICE

(75) Inventor: Jonathan P. Cotter, Dearborn, MI (US)

(73) Assignee: DADCO, Inc., Plymouth, MI (US)

( * ) Notice: Subject to any disclaimer, the term of this patent is extended or adjusted under 35 U.S.C. 154(b) by 233 days.

(21) Appl. No.: 12/120,196

(22) Filed: May 13, 2008

(65) Prior Publication Data
US 2008/0282963 A1 Nov. 20, 2008

Related U.S. Application Data

(60) Provisional application No. 60/938,104, filed on May 15, 2007.

(51) Int. Cl.
*G01L 7/16* (2006.01)
*G01L 9/00* (2006.01)

(52) U.S. Cl. .......................... 116/266; 73/37

(58) Field of Classification Search ............... 116/34 R, 116/266–272; 73/37, 39, 45.4
See application file for complete search history.

(56) References Cited

U.S. PATENT DOCUMENTS

| | | | | |
|---|---|---|---|---|
| 3,747,557 | A * | 7/1973 | Bayly et al. ................. | 116/272 |
| 3,963,891 | A * | 6/1976 | de Magondeaux .......... | 200/308 |
| 4,362,121 | A * | 12/1982 | Pegram ..................... | 116/34 R |
| 4,481,692 | A * | 11/1984 | Kurz ........................... | 15/339 |
| 5,027,740 | A * | 7/1991 | Kramer et al. ............ | 116/34 R |
| 5,344,125 | A | 9/1994 | Cotter | |
| 5,351,562 | A * | 10/1994 | Scott ............................. | 73/37 |
| 5,595,138 | A * | 1/1997 | Claret ....................... | 116/268 |
| 6,003,848 | A | 12/1999 | Cotter et al. | |
| 6,491,143 | B1 | 12/2002 | Stenquist | |
| 7,013,833 | B2 * | 3/2006 | Lemberger et al. ........ | 116/34 R |
| 7,331,570 | B2 * | 2/2008 | Stenquist ................ | 267/64.15 |
| 7,559,542 | B2 * | 7/2009 | Cotter ..................... | 267/64.11 |
| 2006/0033248 | A1 | 2/2006 | Stenquist | |
| 2006/0055093 | A1 | 3/2006 | Cotter | |
| 2008/0282963 | A1* | 11/2008 | Cotter ........................ | 116/266 |

FOREIGN PATENT DOCUMENTS

JP 2008-286794 A * 11/2008

* cited by examiner

*Primary Examiner*—Randy W Gibson
(74) *Attorney, Agent, or Firm*—Reising Ethington P.C.

(57) ABSTRACT

A pressure indicating device includes a case including a gas passage, and a movable indicator carried by the case. The indicator has an end in fluid communication with the gas passage and an indicator end projectable out of a portion of the case when pressure in the gas passage is at least a predetermined minimum pressure. A spring may retract the indicator when pressure in the gas passage is below the predetermined minimum pressure.

17 Claims, 10 Drawing Sheets

PRESSURE INDICATING DEVICE

CROSS-REFERENCE TO RELATED APPLICATION

This application claims the benefit of U.S. Provisional Application No. 60/938,104, filed May 15, 2007.

FIELD OF THE INVENTION

This invention relates to pressurized devices and more particularly to a pressure indicating device for a pressurized device.

BACKGROUND OF THE INVENTION

Various types of pressurized devices are used in industry and there are many manual techniques for evaluating pressurization of such devices. For example, gas springs are one type of pressurized device and are typically used to yieldingly resist movement of a body such as a clamping ring for a metal blank in a die of a press for forming sheet metal parts. These springs are generally constructed with a piston slidably received in a cylinder and defining a pressure chamber charged with a gas, such as nitrogen.

To charge the pressure chamber, pressurized gas is introduced into the pressure chamber in the cylinder through a filler valve until the pressure of the gas within the pressure chamber meets or exceeds a predetermined minimum pressure, such as about 200 to 2,000 PSI. This provides a pressurized cushion at a first end of the piston to permit the piston to yieldably move toward its retracted position when a force, applied to another end of the piston, exceeds the force of the pressurized gas acting on the first end of the piston. In typical use, as the piston approaches its retracted position, thereby decreasing the volume of the gas chamber, the pressure within the chamber may increase, for example, to 5,000 psi or more.

In some applications, the gas pressure within the pressure chamber may fall below the predetermined minimum pressure, for example, because of wear or degradation of a sealing method in the gas spring. In some current applications, an operator must stop an operation, clear obstructions around the gas spring or remove the gas spring from the press, and use external devices to evaluate the gas spring for proper minimum pressure. For example, an operator may have to use a pressure gage to tap into a port of the gas spring to sample the pressure therein. In another example, an operator may have to place a load cell between the gas spring and a movable component and infer the gas pressure in the gas spring based on the load cell readings. In other current applications, analog pressure monitoring devices such as Bourdon tubes may be placed in fluid communication with the pressure chamber of the gas spring.

SUMMARY OF THE INVENTION

One implementation of a pressurized device includes a housing at least partially defining a pressure chamber and including a wall with a passage in the wall in fluid communication with the pressure chamber, and a pressure indicating device disposed in the passage to provide an indication when pressure is below a predetermined minimum pressure in the pressure chamber.

According to another implementation, a pressure indicating device includes a case including a gas passage, a movable indicator carried by the case having an end in fluid communication with the gas passage and having an indicator end projectable out of a portion of the case when pressure in the gas passage is at least a predetermined minimum pressure, and a spring to retract the indicator when pressure in the gas passage is below the predetermined minimum pressure.

BRIEF DESCRIPTION OF THE DRAWINGS

These and other features of exemplary embodiments of the invention will be apparent from the following detailed description of exemplary embodiments and best mode, appended claims, and accompanying drawings in which:

DETAILED DESCRIPTION OF EXEMPLARY EMBODIMENTS

Figure 1:
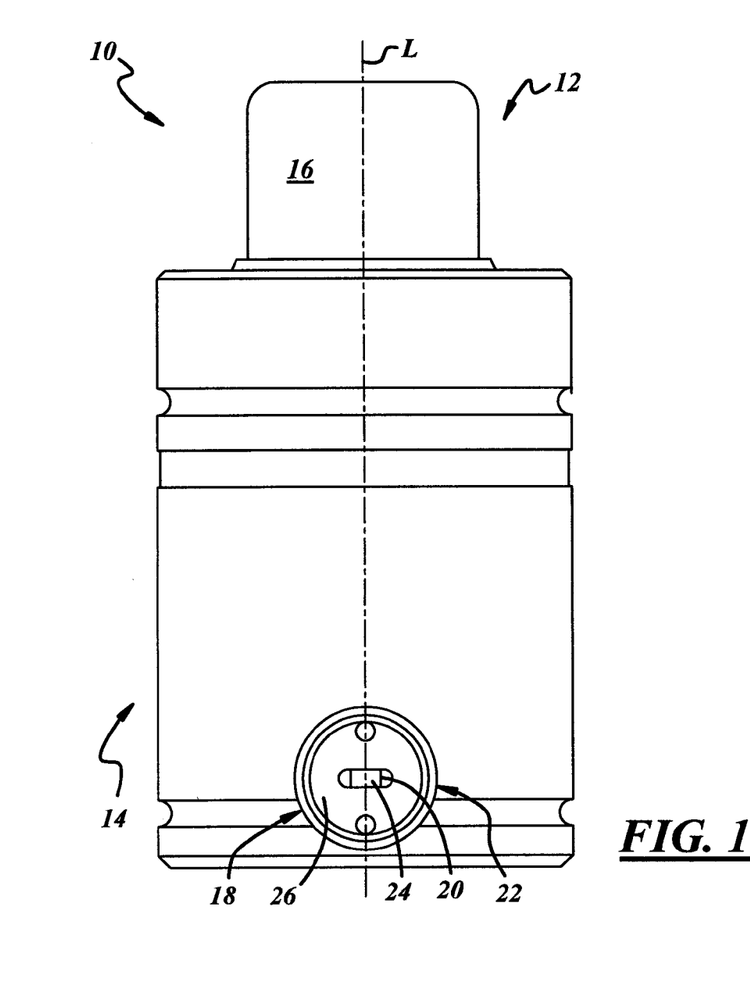
FIG. 1 is a side view of an exemplary form of a gas spring including a pressure indicating device.

Referring in more detail to the drawings, FIG. 1 illustrates one example of a pressurized device in the form of an exemplary gas spring 10 that may be used for yieldably biasing or resisting movement of die components during a press operation. The gas spring 10 may also be used for any other application where a device is needed to yieldably resist movement of a body or to urge a body toward a given position. The gas spring 10 may be connected via hoses to an external supply of pressurized gas, or may be a standalone or self-contained device independent of any centralized supply of gas.

The gas spring 10 may include a piston assembly 12 that may be used to contact a stamping press die component (not shown), and a housing 14 to carry the piston assembly 12. The piston assembly 12 may include a piston 16 configured for reciprocation between fully extended and fully displaced positions along a longitudinal axis L of the gas spring 10.

The gas spring 10 also includes a pressure indicating device 18 carried by the housing 14 to provide an indication of the pressure within the gas spring 10. In one implementation, the pressure indicating device 18 provides a visual indication of whether or not the gas spring 10 is holding a charge of gas at or above a minimum pressure. For example, the pressure indicating device 18 may be a go/no-go type of pressure indicating device and may be adapted for use with a new pressurized device or gas spring design or with any existing pressurized device or gas spring design. A go/no-go type of device includes devices that generally provide a binary type of reading such as on/off, or pass/fail, or the like. In another example, the pressure indicating device 18 may provided an indication of multiple pressure levels between a "go" reading and a "no-go" reading, such as graduated pressure levels.

Figure 2:
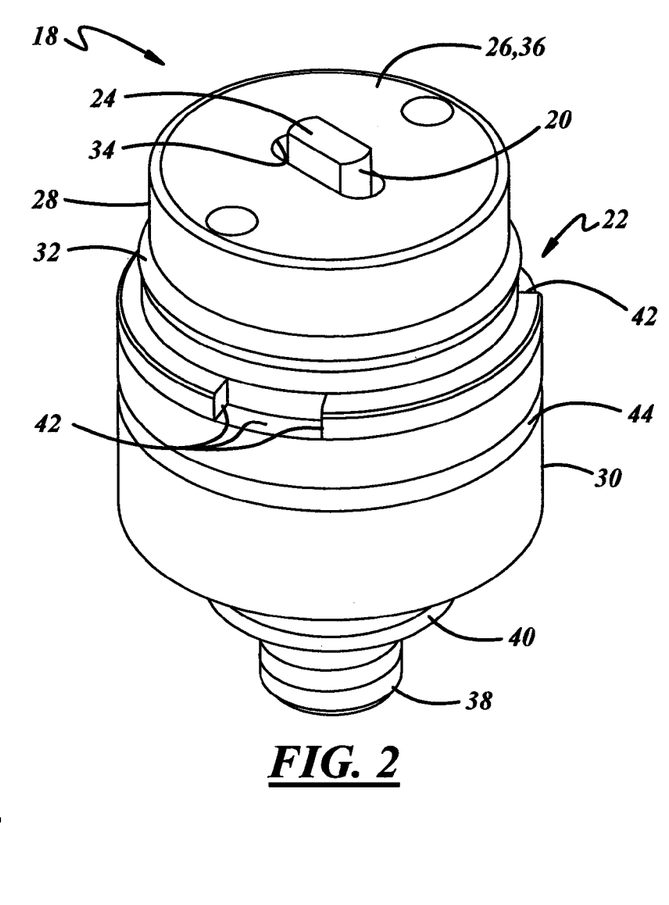
FIG. 2 is an enlarged perspective view of the pressure indicating device of FIG. 1.

Referring also to FIG. 2, the pressure indicating device 18 includes an indicator 20, and a case 22 to support the indicator 20 and mount the pressure indicating device 18 to the gas spring housing 14 (FIG. 1). The indicator 20 may be constructed of a single component or multiple components, and may have an indicator end 24 that is projectable beyond an end 26 of the case 22 in a "go" state to serve as a visual indication of presence of at least a predetermined minimum pressure in the gas spring 10.

Referring now to FIG. 2, the case 22 may include a first body 28 that may at least partially support the indicator 20, and a second body 30 that may support the first body 28, partially support the indicator 20, and connect the pressure indicating device 18 to the gas spring housing 14 (FIG. 1). The first body 28 may carry a seal 32 used for sealing the indicator to the gas spring housing 14 (FIG. 1), and an indicator passage 34 in a transverse wall 36 of the body 28. The second body 30 may include an integral threaded male fitting 38 at one end to engage the gas spring housing 14 (FIG. 1), a seal 40 adjacent the fitting 38, installation tooling features 42 such as slots at an opposite end, and a circumferentially continuous crimped portion 44 between the ends for integral coupling of the second body 30 to the first body 28 as will be discussed in further detail below.

The second body 30 may be part of the pressurized device instead of a separate component. In other words, the second body 30 may be integrated into the pressurized device, and the first body 28 and the rest of the components may be assembled directly to the pressurized device.

Figure 3:
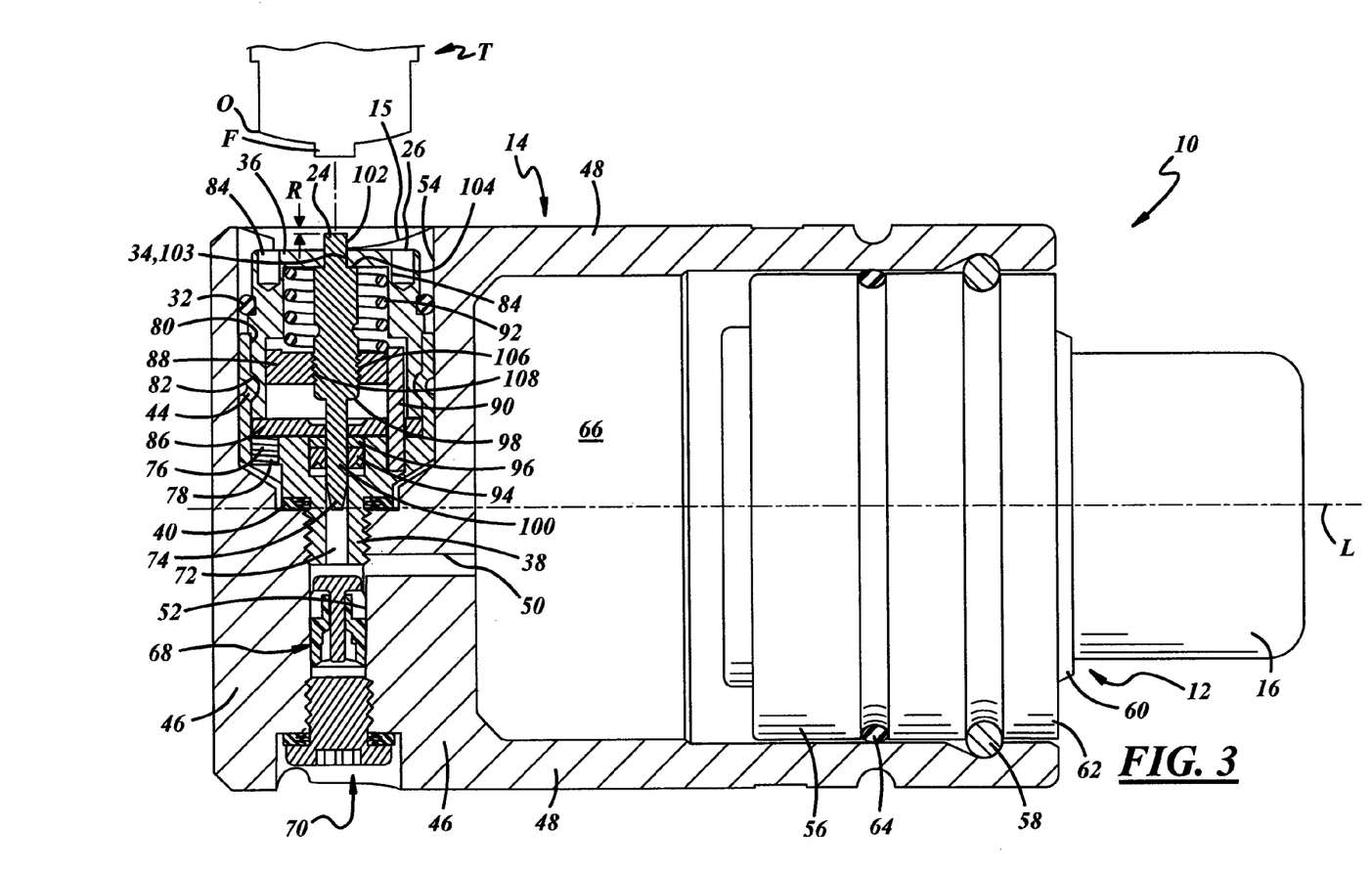
FIG. 3 is a cross-sectional view of the gas spring taken along line 3-3 of FIG. 1, showing the pressure indicating device, a filler valve, and an exemplary piston assembly.

Referring now to FIG. 3, the gas spring housing 14 may include a transverse wall 46 such as an end wall, and an axial wall 48 extending axially from the transverse wall 46. As used herein, the term transverse includes orientation at an angle with respect to an axial orientation. In other words, a transverse feature may be perpendicular to the longitudinal axis L of the gas spring 10, or may be disposed at any other angle between 0 and 180 degrees with respect to the longitudinal axis L. In any case, the walls 46, 48 may define an open-ended cylinder in which the piston assembly 12 may be at least partially disposed. The housing 14 may be cylindrical or of any other suitable shape.

The housing 14 may also include one or more passages disposed in the transverse wall 46 in fluid communication with the cylinder. A first passage 50 may extend substantially axially through a portion of the transverse wall 46 as shown, or may be disposed on an angle. Similarly, a filler or second passage 52 may be disposed in the transverse wall 46 in fluid communication with the first passage 50, and may extend substantially transversely as shown, or may be disposed on an angle. Likewise, a third or gas passage 54 may be disposed in the transverse wall 46 in fluid communication with one or both of the first and second passages 50, 52. The third passage 54 may extend substantially transversely, or may be disposed on an angle, and may be substantially coaxial with the second passage 52 as shown. The third passage 54 may be a counter-bored passage, as shown. The third passage 54 and the pressure indicating device 18 may be transversely oriented as shown, for example, in gas spring applications of about 30 mm to 300 mm in diameter or more, but may instead be oriented generally axially in smaller gas spring applications of less than about 30 mm in diameter.

The piston assembly 12 may include any suitable components to mount the piston 16 to the housing 14. For example, the piston assembly 12 may include a bearing and seal cartridge 56 to movably mount the piston 16 within the housing 14, and a retaining ring 58 to retain the bearing and seal cartridge 56 to the housing 14. The piston assembly 12 may further include a wiper 60 and a dust cover 62 carried by the cartridge 56 and disposed between the cartridge 56 and the piston 16 to protect the inside of the piston assembly 12 from contaminants. The piston assembly 12 may additionally include a circumferentially continuous seal 64 to seal the assembly 12 to the housing 14. In any case, the piston assembly 12 and the housing 14 together may define a pressure chamber 66 whose volume may vary depending on the axial position of the piston 16.

The gas spring 12 may also include a charging or filler valve 68, such as a one-way or check valve, which may be threaded into the second passage 52. The filler valve 68 may admit gas into the pressure chamber 66 through the second and first passages 52, 50 and may prevent any gas from exiting the pressure chamber 66 through the first and second passages 50, 52. The gas spring 10 may further include a port plug 70 to seal the second passage 52 and that may be threaded into the second passage 52 and partially located within a counterbore thereof.

Figure 4:
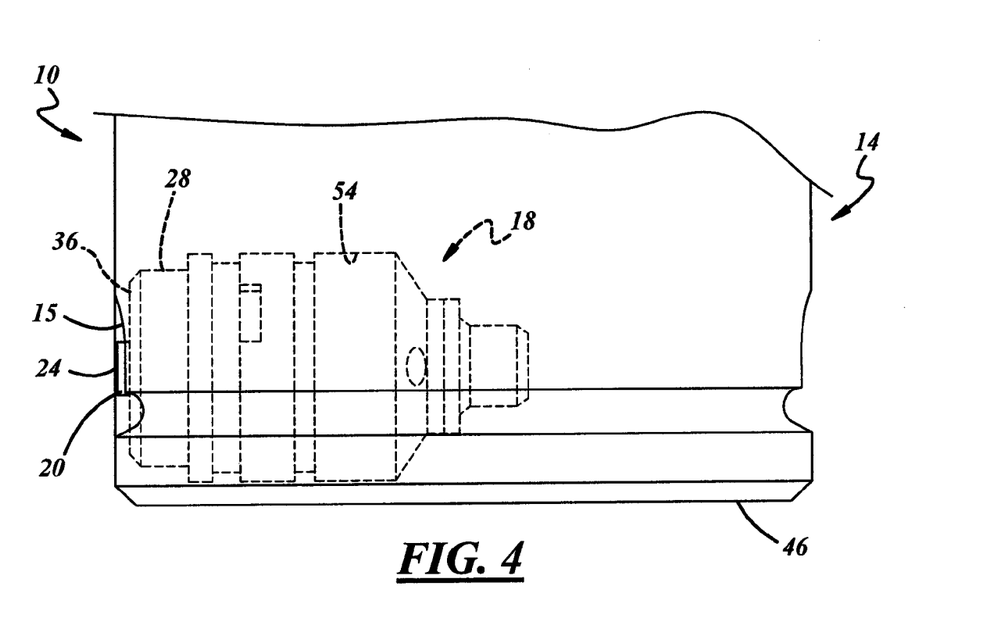
FIG. 4 is an enlarged fragmentary view of the gas spring of FIG. 3 illustrating a pressure indicating device in a go or extended position.
Figure 5:
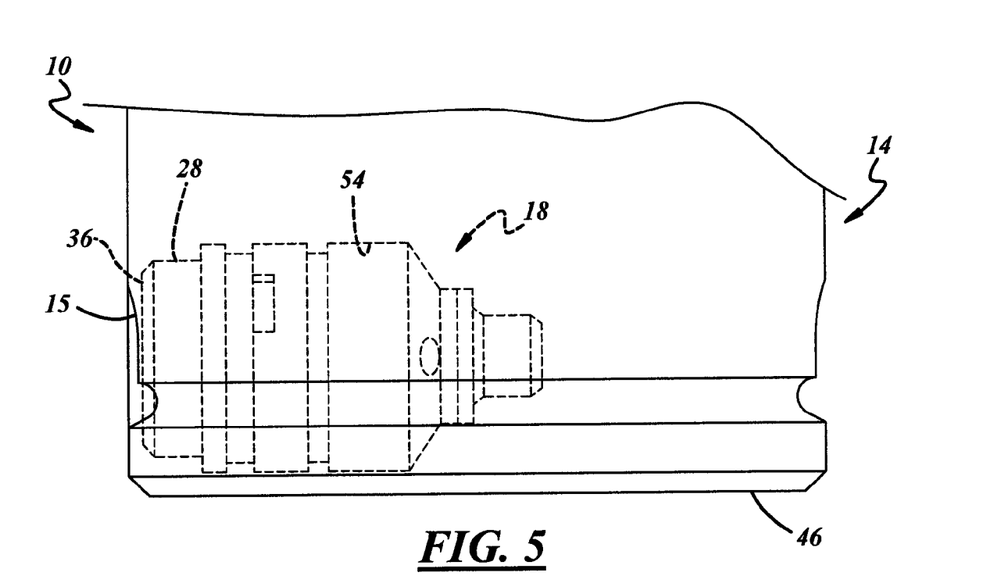
FIG. 5 is an enlarged fragmentary view of the gas spring of FIG. 3 illustrating the pressure indicating device in a no-go or retracted position.

Referring to FIGS. 3 through 5, the pressure indicating device 18 is received within the counterbored third passage 54 of the gas spring housing 14. As shown, the pressure indicating device 18 may be confined within an outer envelope of the gas spring housing 14. More specifically, even when the indicator 20 is in its fully extended position as shown in FIG. 3, the pressure indicating device 18 may be mounted to the housing 14 such that it is at least flush or radially inboard of an outer periphery or diameter of the housing 14 as indicated by dimension R. FIG. 4 illustrates an alternative form wherein the indicator 20 is flush with the outer periphery of the housing 14 in its fully extended position according to a go state of the pressure indicating device 18. FIG. 5 illustrates a no-go state in which the internal pressure of the gas spring 10 is below a predetermined minimum pressure and wherein the indicator (not shown) is retracted within the first body 28 of the pressure indicating device 18 and not visible by an operator. FIGS. 3 through 5 illustrate a relieved portion 15 of the gas spring housing 14 that may be provided to facilitate visibility of the end 26 of the pressure indicating device 18 and the indicator 20 when it is extended.

Figure 6:
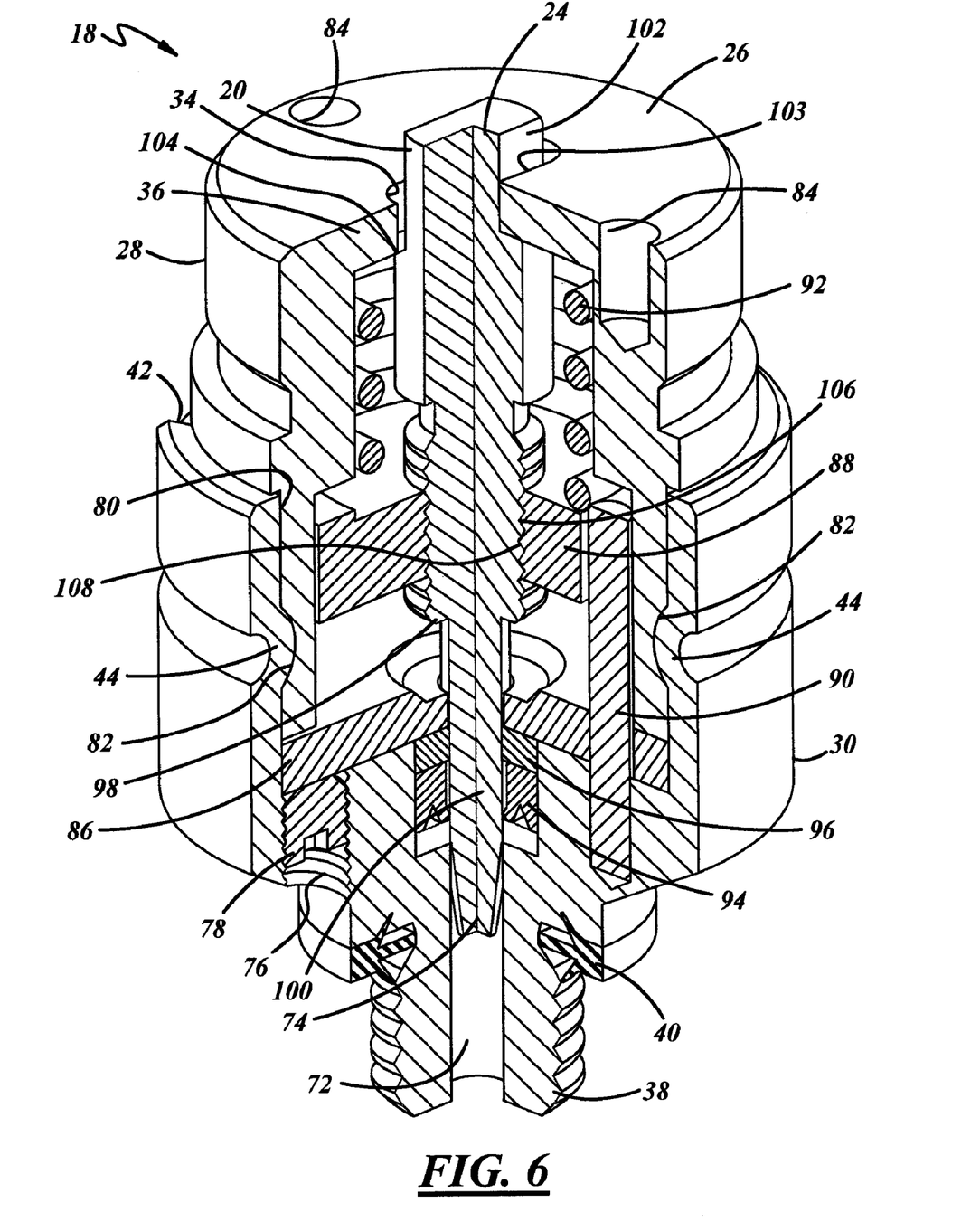
FIG. 6 is a quarter-sectional perspective view of the pressure indicating device of FIG. 1.

Referring to FIGS. 3 and 6, the second body 30 includes an inlet passage 72 at its threaded end to admit gas from the gas spring pressure chamber 66 (FIG. 3) and to carry a forward end 74 of the indicator 20. Thus, the forward end 74 of the indicator 20 is exposed to the gas pressure within the pressure chamber 66. The second body 30 may additionally include one or more threaded set screw passages 76 to carry one or more set screws 78, and an open end 80 to receive the first body 28.

The first body 28 includes a circumferentially continuous groove 82 to receive the crimped portion 44 of the second body 30 so as to axially retain the bodies 28, 30 together yet permit rotational movement between the bodies 28, 30. The end 26 of the first body 28 may also include adjustment tooling features 84 such as holes or the like to enable the first body 28 to be rotated during adjustment of the pressure indicating device 18, as will be described herein below.

The pressure indicating device 18 may include additional components. For example, an intermediate plate 86 may be disposed between the bodies 28, 30 and adapted to engage the set screw 78 carried in the set screw passage 76 of the second body 30, as will be described in further detail below. Also, a spring plate 88 may be threaded to the indicator 20 between the bodies 28, 30, one or more guide pins 90 may be carried by the second body 30 to guide movement of the spring plate 88, and a spring 92 may be disposed between the first body 28 and the spring plate 88 to bias the indicator 20 toward the second body 30 to a no-go position. The spring 92 may be selected to provide a force that will move the indicator 20 to its no-go position when gas pressure in the pressure chamber 66 of the gas spring 10 (FIG. 3) falls below a predetermined minimum pressure value. Any suitable type of spring may be used such as a coiled compression spring as shown and, more specifically, the spring 92 may have a linear or non-linear spring rate. Further, a circumferentially continuous seal 94 may be carried between the indicator 20 and the second body 28 to prevent pressurized gas from escaping downstream between the indicator 20 and the case 22, and a backup ring 96 may be disposed between the intermediate plate 86 and the seal 94 to help guide the indicator 20 and prevent extrusion of the seal 94.

The indicator 20 may include a first shoulder 98 for limiting return movement of the indicator 20, and a seal stem 100 between the forward end 74 and the shoulder 98 for cooperating with the seal 94. The indicator end 74 extends through the indicator passage 34 of the first body 28, and the indicator end 24 and the passage 34 may be formed with corresponding anti-rotation features 102, 103, such as flats, to transmit torque and prevent relative rotation therebetween. Accordingly, rotation of the first body 28 relative to the second body 30 causes rotation of the indicator 20. The indicator 20 may further include a second shoulder 104 adjacent the indicator end 24 to limit advance movement of the indicator 20. The indicator 20 may also include an externally threaded portion 106 for threading engagement with an internal thread 108 of the spring plate 88.

Referring to FIG. 3, to install the pressure indicating device 18 to the gas spring housing 14, an installation tool T may be used. The tool T may be uniquely designed to deter tampering with the pressure indicating device 18 after it is assembled and calibrated to the gas spring housing 14. Accordingly, the tool T may include one or more tooling features F such as lugs at an open end 0 that may be used to engage the one or more tooling features 42 (FIGS. 2 and 6) of the second body 30 when the pressure indicating device 18 is partially inserted into the open end 0 of the tool T. The lugs F may be three in quantity and may be circumferentially spaced, equidistantly or otherwise.

The tool T and pressure indicating device 18 are assembled to the gas spring housing 14 so that the threaded fitting 38 of the case 22 is inserted into and threadably engages the third passage 54. The tool T and pressure indicating device 18 are then rotated until the seal 40 between the second body 30 and the housing 14 is suitably compressed. Thereafter, the tool T may be withdrawn from the counterbored third passage 54, leaving the circumferentially continuous seal 32 disposed between the pressure indicating device 18 and the housing 14 to seal the counterbored third passage 54 and thereby prevent contaminants from entering the passage 54. The design of the pressure indicating device 18 may be modular such that it may be easily removed using the installation tool T, and can be replaced with another pressure indicating device if desired.

In use, if the pressure within the pressure chamber 66 ever falls below the predetermined pressure, then the force imposed on the indicator 20 by the spring 92 will exceed the force imposed on the indicator 20 by the gas pressure and, thus, the indicator 20 will move to a no-go or return position. Referring also to FIG. 4, in its go position the indicator end 24 of the indicator 20 may project beyond the end surface 26 of the case 22 to any distance, for example, from about 0.5 to 3 mm or more. In other words, the indicator end 24 may be configured to be projectable out of a portion of the case 26 and, more particularly, to project out of the case 26 to serve as a visual indication of presence of at least a predetermined minimum pressure in the gas spring 10.

In contrast, in its no-go position, the indicator end 24 of the indicator 20 may be flush with or recessed within the case 22 so that an operator will be able to visually verify that the pressure indicating device 18 is in a no-go state, as shown in FIG. 5. In other words, the indicator end 24 may be retractable into the case 22 to serve as a visual indication of absence of at least a predetermined minimum pressure in the gas spring 10.

Referring to FIG. 6, to adjust the pressure indicating device 18, the spring 92 may be preloaded to modify the force imposed on the indicator 20 by the spring 92. To preload the spring 92, an adjustment tool (not shown) may be used to engage a portion of the first body 28, such as the adjustment tooling features 84, and to rotate the first body 28 relative to the second body 30. By virtue of the corresponding torque transmitting features 102, 103 of the indicator 20 and first body 28, rotation of the first body 28 also causes rotation of the indicator 20. Also, because the spring plate 88 is rotatably fixed by the guide pin(s) 90 and is threaded onto the indicator 20, rotation of the indicator 20 causes the spring plate 88 to thread axially along the indicator 20 toward or away from the spring 92 to compress the spring 92 or allow it to extend. Thus, the spring 92 may be preloaded to any degree to vary the return force applied to the indicator 20.

After the pressure indicating device 18 is adjusted, for example, at the factory where the gas spring 10 is produced, it may be desirable to deter others from thereafter making any further adjustments. Accordingly, once the adjustment is complete, the set screw(s) 78 may be tightened against the intermediate plate 76 to impose a force on the intermediate plate 76 and, in turn, against the end of the first body 28 to frictionally axially engage the corresponding crimped portion 44 and groove 82 of the bodies 30, 28 to prevent relative rotation therebetween and thereby deter tampering with the pressure indicating device 18. Thus, the set screw(s) 78 and intermediate plate 76 prevent relative rotation between the bodies 28, 30. In another form, one or more set screws 78 may be configured to impose a force directly on the end of the first body 30, or may include a radially oriented set screw threaded through the case 22 to lock the first and second bodies together 28, 30. In other words, any suitable apparatus or arrangement may be used to prevent relative rotation between the bodies 28, 30. Such an apparatus may also lock the indicating device 18 to prevent unintended changes or movement due to vibration or the like.

FIGS. 7-20 illustrate several other exemplary embodiments of pressure indicating devices. These embodiments are similar in many respects to the embodiment of FIGS. 1-6 and like numerals between all of the embodiments generally designate like or corresponding elements throughout the several views of the drawing figures. Additionally, the descriptions of all of the embodiments are incorporated by reference into one another and the common subject matter generally may not be repeated here.

Figures 7, 8, 9:
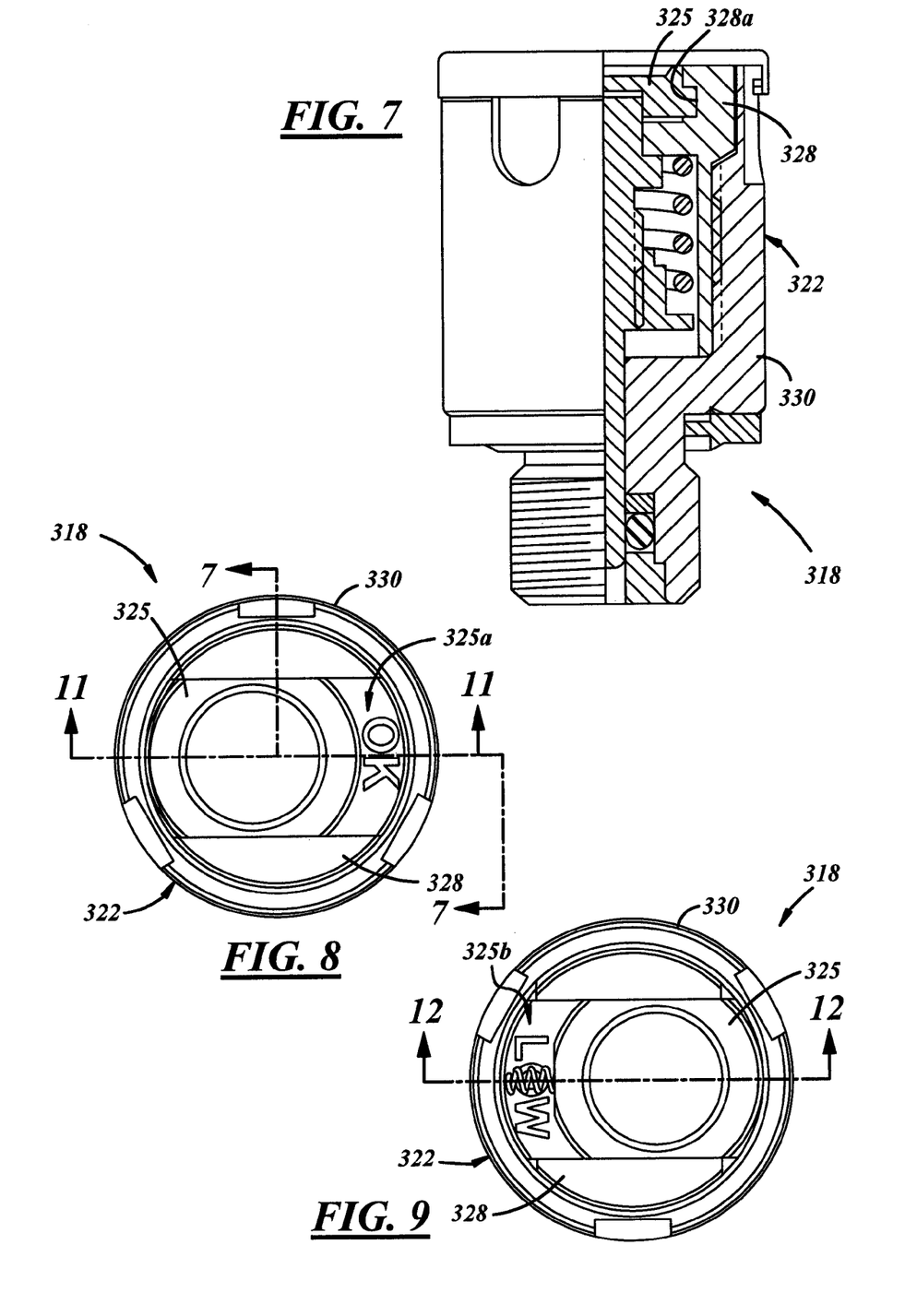
FIG. 7 is a quarter-sectional view of another exemplary embodiment of a pressure indicating device.
FIG. 8 is a top view of the pressure indicating device of FIG. 7, illustrating a flag in a go position.
FIG. 9 is another top view of the pressure indicating device of FIG. 7, illustrating the flag in a no-go position.

Referring now to FIGS. 7 through 9, another exemplary pressure indicating device 318 generally may include a case 322 including a first body 328 and a second body 330 carrying the first body 328. The device 318 also includes an indicator 320 carried by the case 322, and a flag 325 that may be carried by the first body 328 for cooperation with the indicator 320.

The flag 325 may include a substantially planar component or mechanical device that is movable in a direction generally transverse with respect to the longitude or length of the indicator 320. The flag 325 may be slidably carried by the first body 328 so as to expose a first or "go" indicia 325a (e.g. "OK") in one position to indicate pressurization, and a second or "no-go" indicia 325b (e.g. "LOW") in another position to indicate a lack of desired pressurization level. For example, as best shown in FIG. 7, the first body 328 may include channels 328a to receive corresponding portions of the flag 325 such that the flag 325 may be slidably retained by the first body 328 in a transverse direction.

Figure 10:
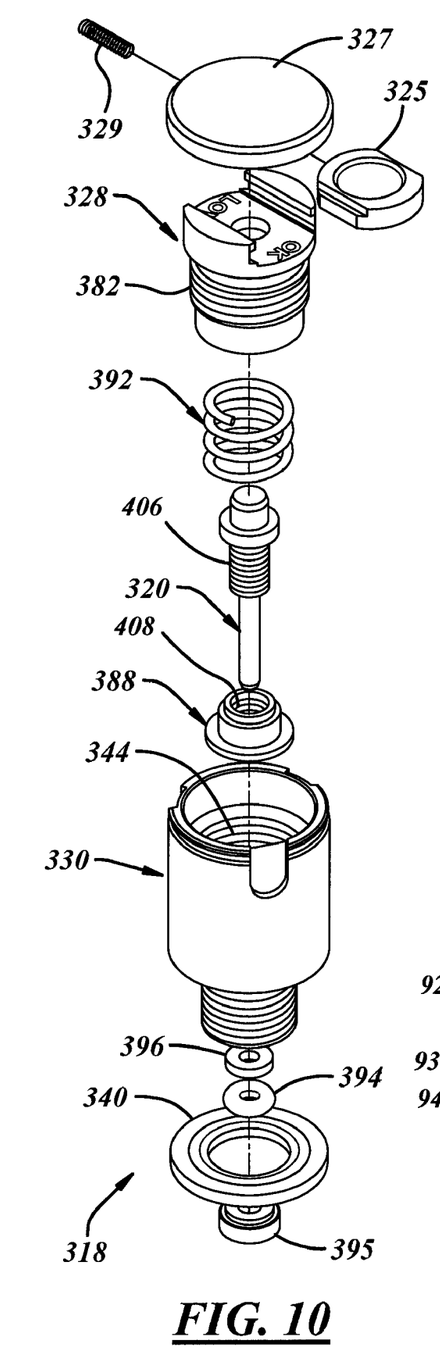
FIG. 10 is an exploded perspective view of the pressure indicating device of FIG. 7.

Referring to FIG. 10, the indicating device 318 may also include a cover 327 to protect the flag 325, which may be transparent and may be composed of any suitable plastic or glass material. The cover 327 may be snap-fit or threaded to, or otherwise carried by, an end of the second body 330 in any suitable fashion.

The indicating device 318 may further include a spring 329 such as a coiled compression spring or any other suitable device to bias the flag 325 toward its no-go position. As used herein, the term spring includes any suitable device or component capable of imposing a bias force. In assembly, the spring 329 may be operatively coupled between a portion of the flag 325 at one end and a portion of the second body 330 at another end.

In the indicating device 318, the second body 330 may include threads 344 or any other suitable engagement feature (s) to receive corresponding threads 382 or any other suitable engagement features of the first body 328 so as to couple the bodies 328, 330 in one exemplary constitution of the case 322 (FIG. 7). The indicating device 318 may also include a pressure indicator 320, a spring plate 388 coupled to the indicator 320 in any suitable manner such as by corresponding threads 406, 408, and a spring 392 interposed between the plate 388 and the first body 328. The indicating device 318 may additionally include a seal 394, a backup ring 396, and a bushing 395, all of which may be carried by the second body 330 between the indicator 320 and the second body 330. Finally, the second body 330 may carry a face seal 340 at a threaded end of the device 318.

Figure 10A:
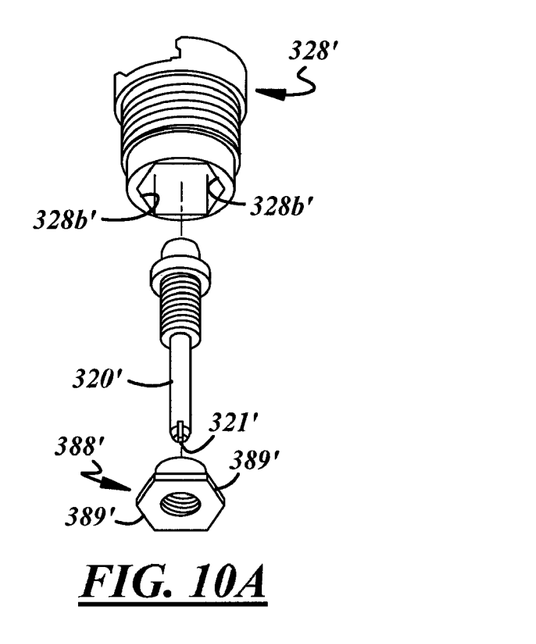
FIG. 10a is a partial exploded perspective view of a modification to the device of FIG. 7.

In another implementation, shown in FIG. 10A, an indicating device 318' includes a spring plate 388' and a first body 328' that may include interengagement or anti-rotation features. For example, the spring plate 388' may include one or more flats 389' on its outer perimeter and the first body 328' may include one or more corresponding flats 328b' on a corresponding inner perimeter. Also, an indicator 320' may include an engagement feature 321' to cooperate with a tool to set a preload of the device 318', which purpose will be described in further detail herein below. The engagement feature 321' may include a slot, flats, hex socket, or any other suitable feature that may enable a tool to rotate the indicator 320'.

Figure 11:
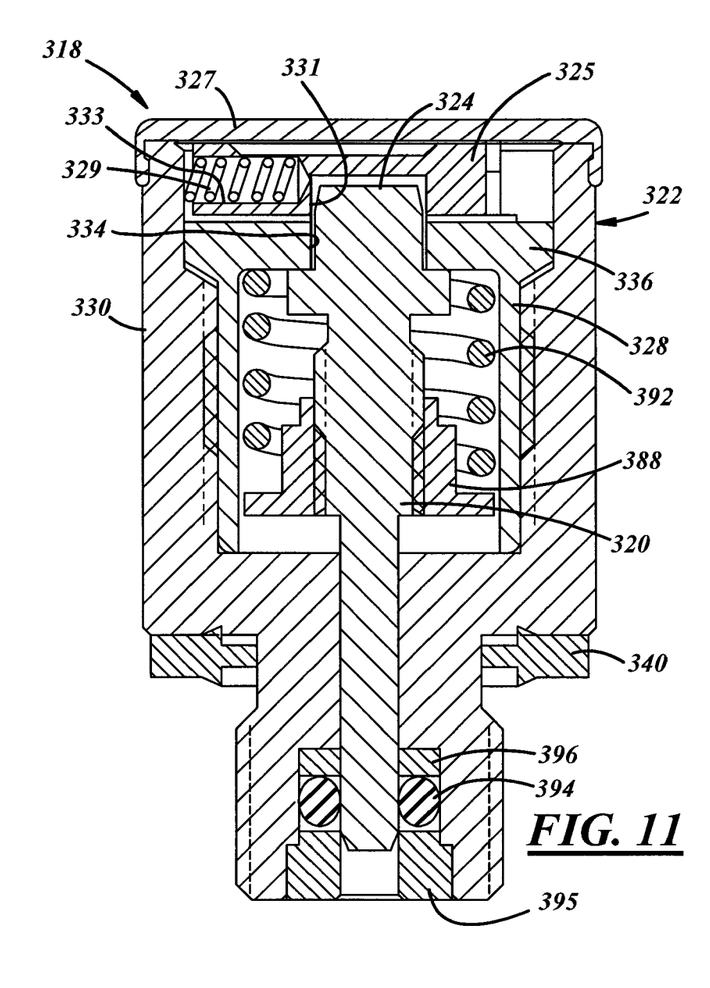
FIG. 11 is cross-sectional view of the pressure indicating device of FIG. 7, taken along line 11-11 of FIG. 8.
Figure 12:
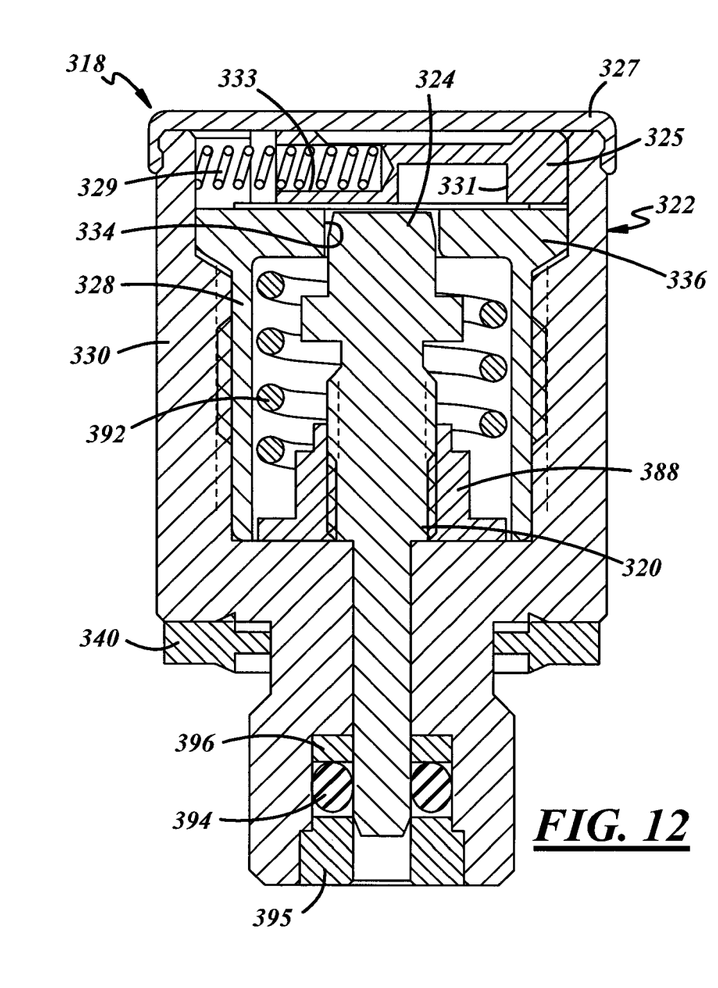
FIG. 12 is cross-sectional view of the pressure indicating device of FIG. 7, taken along line 12-12 of FIG. 9.

Referring to FIGS. 11 and 12, the first body 328 may include an indicator passage 334 in a transverse wall 336 of the body 328 to receive an indicator end 324 of the indicator 320 therethrough when the device 318 is pressurized. Accordingly, the indicator end 324 is projectable out of a portion of the case 322. Similarly, the flag 325 may include a pocket 331 to receive the end 324 of the indicator 320 and to retain the flag 325 is in its go position as shown in FIG. 11. The flag 325 may also include a transverse pocket 333 to at least partially receive the spring 329 therein.

In use, the device 318 may be preset for a certain load or pressure rating such that no external adjustment is necessary. For example, the spring rate of and the preload on the spring 392 may be predefined by a manufacturer the device 318. The spring rate may be varied by using different springs, and the preload may be varied by adjusting the position of the spring plate 388 on the indicator 320 to compress the spring 392 to a varying degree. Once the plate 388 is adjusted on the indicator 320 in a desired location to set the preload, the plate 388 and indicator 320 may be fixed to one another such as by an adhesive, tack welding, crimping, or the like. Accordingly, the device 318 may be resistant to any tampering with the preload once the device 318 has left the factory and reached the field.

In the implementation illustrated in FIG. 10A, however, the preload of the device 318' may be adjusted in the field or field-adjustable. To apply or adjust a preload on the spring 392, an adjustment tool (not shown) may be used to engage the engagement feature(s) 321' of the indicator 320' and to rotate the indicator 320' relative to the first body 328. Because the spring plate 388' is rotatably fixed by the corresponding torque transmitting features of the spring plate 388' and first body 328', and because the spring plate 388' is threaded onto the indicator 320', rotation of the indicator 320' causes the spring plate 388' to thread axially along the indicator 320' in a direction toward or away from the spring 392 to compress the spring 392 or allow it to extend. Thus, the spring 392 may be preloaded in the factory or in the field to any desired degree to vary the return force applied to the indicator 320'.

Referring to FIGS. 11 and 12, the device 318 may be coupled in a suitable location with respect to a gas spring (not shown) or any other suitable pressurized device. Once suitably coupled, the cover 327 may be removed, and the flag 325 retracted against the force imposed by the spring 329 until the indicator end 324 of the indicator 320 advances into the pocket 331 of the flag 325. At this point, the flag 325 is set, the device 318 indicates sufficient pressurization, and the cover 327 may be reinstalled.

In the event that pressure in the pressurized device falls below a desired pressurization level, the force of the spring 392 will move or retract the indicator 320 in a direction away from the indicating end of the device 318. Accordingly, the end 324 of the indicator 320 becomes displaced from the pocket 331 of the flag 325, and the spring 329 displaces or slides the flag 325 from its go position to its no-go position as shown in FIG. 12. At this point, an operator can see that the device 318 indicates a no or low pressure condition and can take appropriate action. Once the pressurized device to which the indicating device 318 is coupled is repressurized, then the flag 325 may be reset as discussed above.

Figure 13:
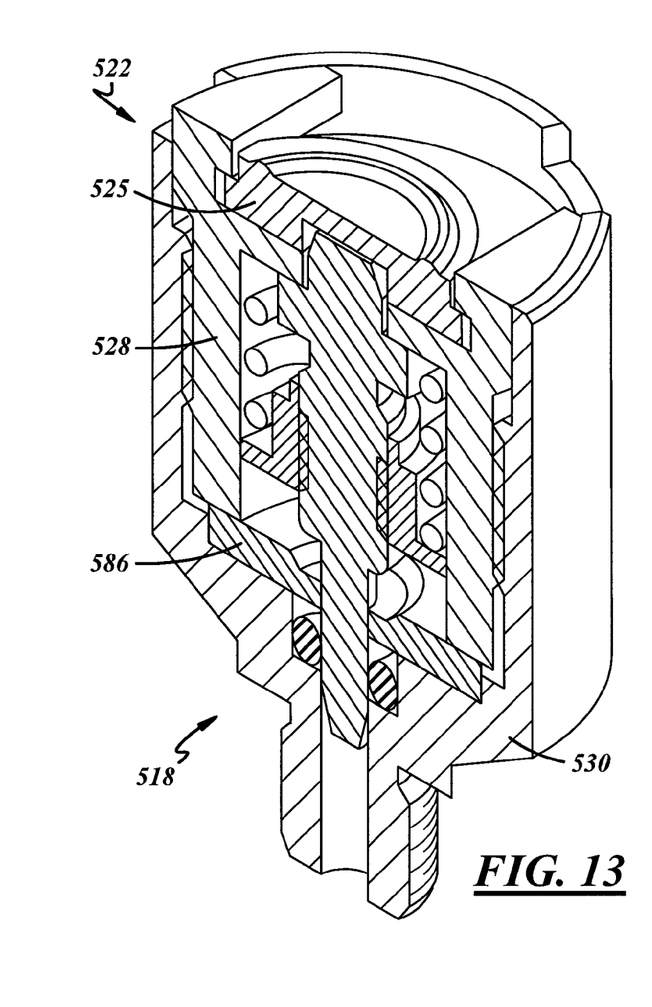
FIG. 13 is a cross-sectional perspective view of another exemplary embodiment of a pressure indicating device.
Figure 14:
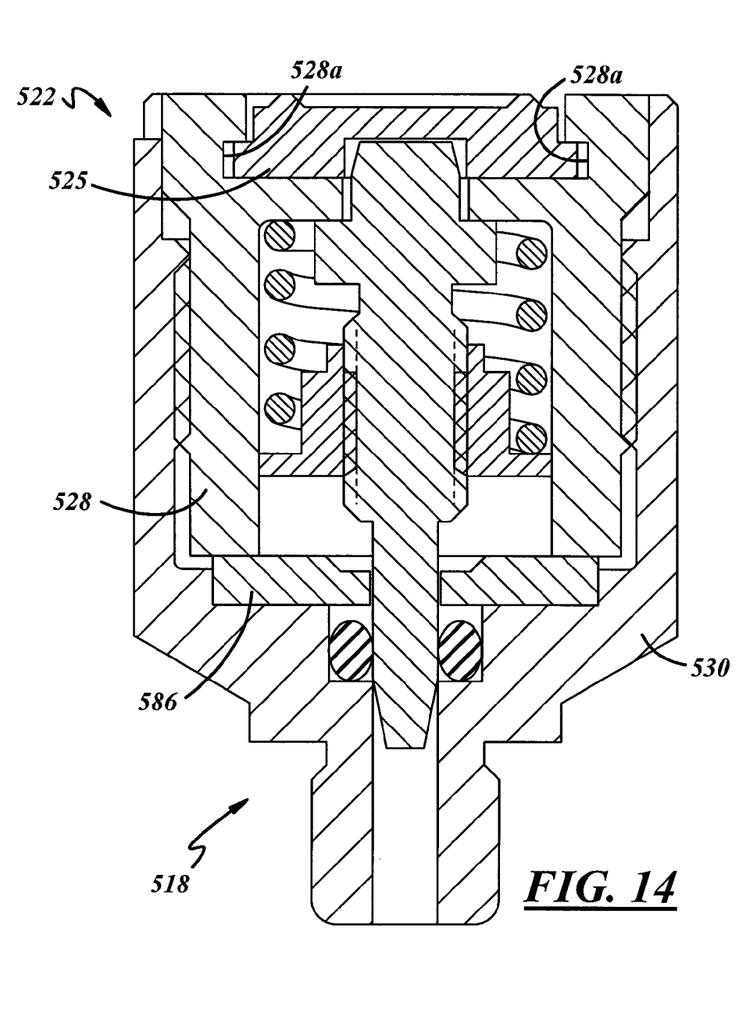
FIG. 14 is a cross-sectional view of the device of FIG. 13.
Figures 15, 16, 19:
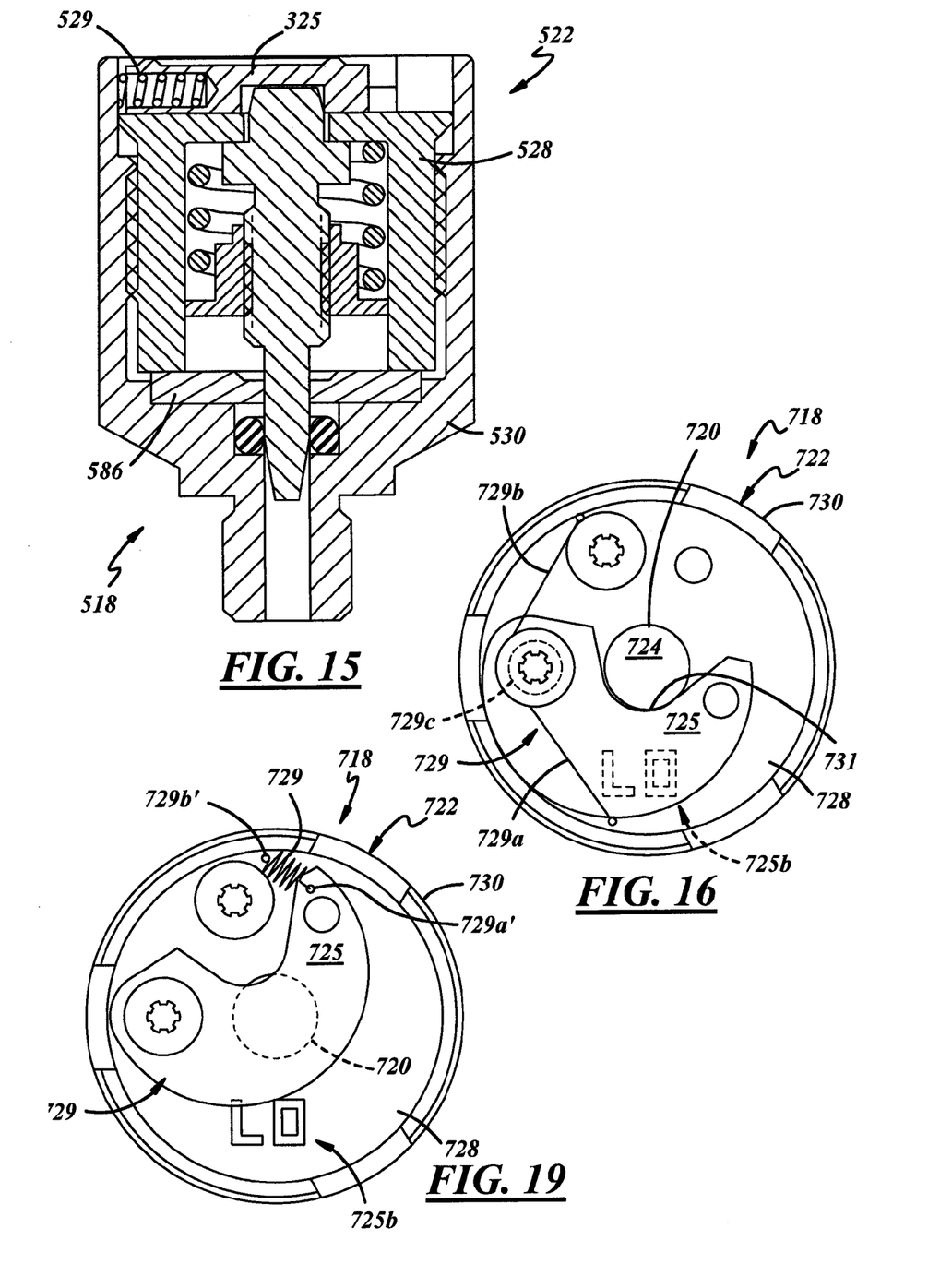
FIG. 15 is a cross-sectional view of the device of FIG. 13, taken 90 degrees with respect to the view of FIG. 14.
FIG. 16 is a top view of another exemplary embodiment of a pressure indicating device.
FIG. 19 is a top view of a modification to the device of FIG. 16.

Referring to FIGS. 13 through 15, another exemplary pressure indicating device 518 is substantially similar to the device 318 of FIGS. 7-12, except fewer components are used and a sealing arrangement is different. In general, the device 518 may include a case 522 that may include a first body 528 and a second body 530 carrying the first body 528, a flag 525 that may be carried by the first body 528, and an indicator 520 carried by the case for cooperation with the flag 525. The indicator 520 may include an indicator end 524 projectable out of a portion of the case 522. The flag 525 may be slidably carried in channels 528a of the first body 528 that receive corresponding portions of the flag 525 such that the flag 525 may be slidably retained by the first body 528 in a transverse direction.

One difference with this device 518 includes a sealing plate 586 axially disposed between one end of the first body 528 and an inside bottom surface of the second body 530. The flag 525 and the first body 528 may be composed of aluminum, which may be anodized to provide contrasting colors between the flag 525 and body 528. The second body 530 may be composed of steel for good strength. The sealing plate 586 may be composed of brass, which may be closely toleranced with the second body 530 with little to no risk of marring or other damage therebetween and with enough strength to support pressure loads without too much deflection. The sealing plate 586 may provide good backup support for the seal 394. The aforementioned components may be composed of any suitable materials, other than those mentioned here.

Referring to FIGS. 16 through 19, another exemplary pressure indicating device 718 is substantially similar to the device 518 of FIGS. 13-15, with the exception that the device 718 uses a different flag configuration. In general, the device 718 generally may include a case 722 that may include a first body 728 and a second body 730 carrying the first body 728, a flag 725 that may be carried by the first body 728, and an indicator 720 carried by the case for cooperation with the flag 725.

But whereas the flags 325, 525 of the previous exemplary embodiments were slidably carried, here the flag 725 may be pivotably carried. For example, the flag 725 may be pivotably coupled to the first body 728 by a pivot 728a such as a fastener, which may extend through a passage in the flag 725 and may be threaded into an end of the first body 728.

Figure 17:
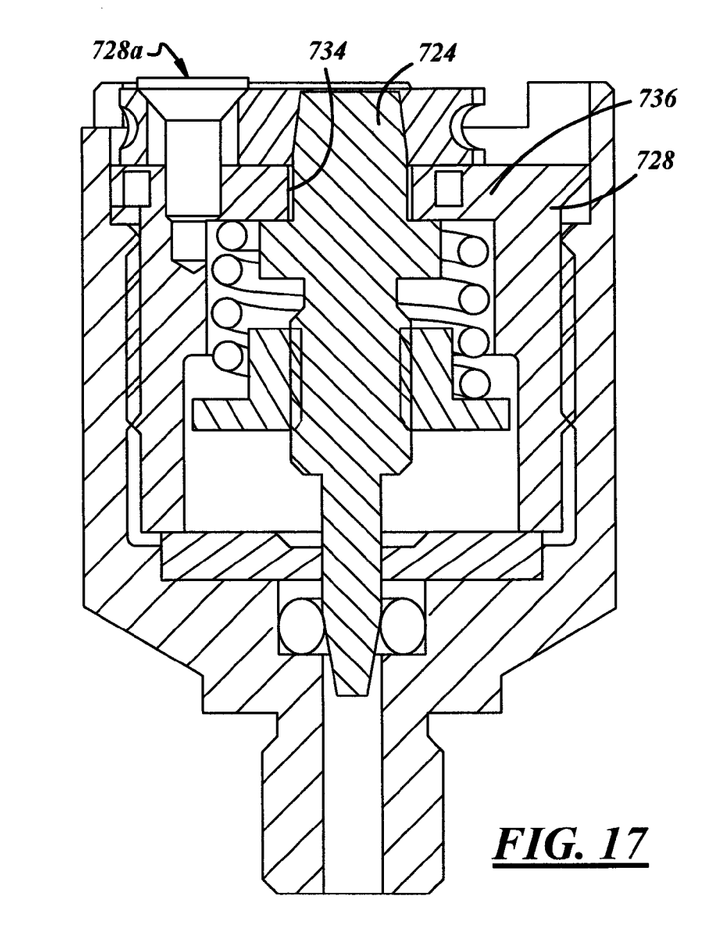
FIG. 17 is a cross sectional view of the device of FIG. 16, taken along line 17-17 thereof.
Figure 18:
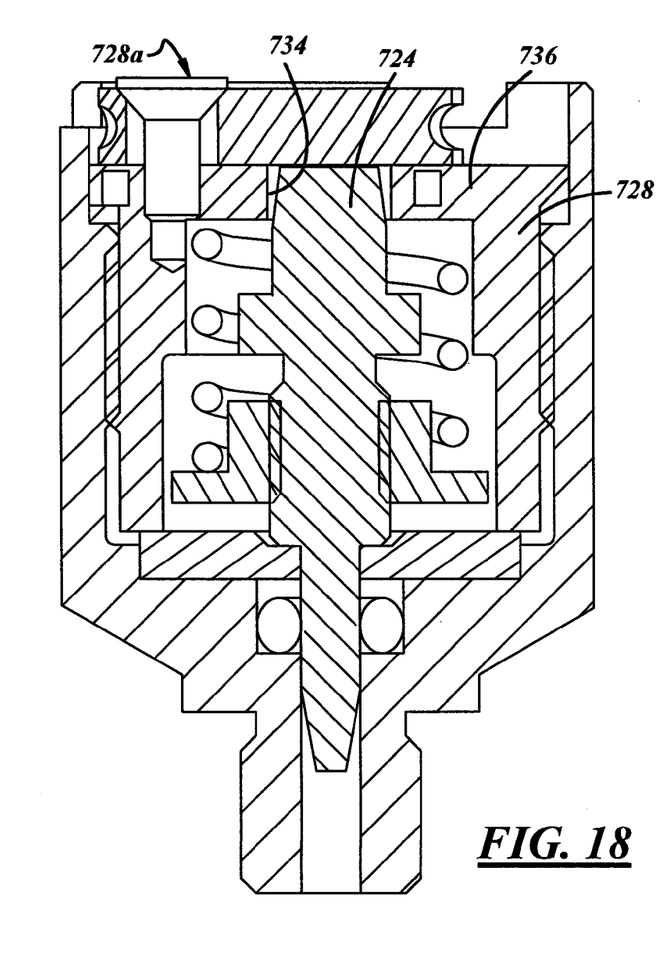
FIG. 18 is a cross sectional view of the device of FIG. 16, taken along line 18-18 thereof.

Referring also to FIGS. 17 and 18, the first body 728 may include an indicator passage 734 in a transverse wall 736 of the body 728 to receive an indicator end 724 of the indicator 720 therethrough when the device 718 is pressurized. The indicator 720 may include an indicator end 724 that is projectable out of a portion of the case 722. Similarly, as shown in FIG. 16, the flag 725 may include a pocket 731 to receive the end 724 of the indicator 720 and to retain the flag 725 in its go position as shown in FIGS. 16 and 17. The pocket 731 may be a lateral side of the flag 725 as shown, or may be longitudinal recess (not shown) in a bottom surface of the flag 725 that faces the indicator 720.

The indicating device 718 may further include a spring 729 such as a torsional spring or any other suitable device to bias the flag 725 toward its no-go position. The spring 729 may include a first or movable leg 729a coupled to one side of the flag 725, a second or stationary leg 729b coupled to the case 722, and a coil 729c disposed about the pivot 728 in any suitable manner. Accordingly, when the flag 725 is set and the indicator 720 retracts due to no or low pressurization, the flag 725 may pivot clockwise under the bias force of the spring 728 to expose no-go indicia 725b. FIG. 19 illustrates another exemplary form of the spring 729, which may be a coiled tension spring 729' having a movable end 729a' coupled to a portion of the flag 725, and a stationary end 729b' coupled to the case 722 in any suitable manner.

Figure 20:
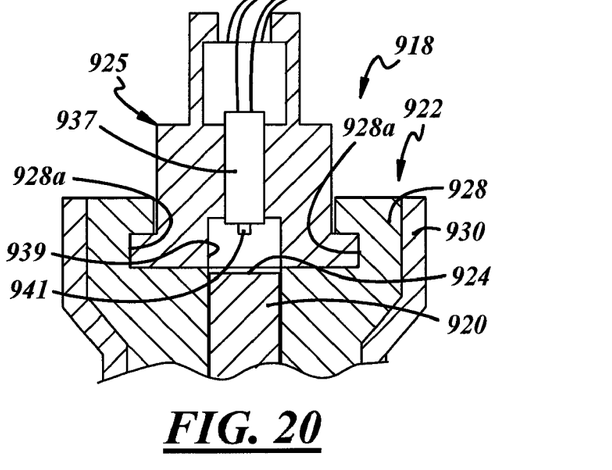
FIG. 20 is a partial cross-sectional view of another exemplary embodiment of a pressure indicating device.

FIG. 20 illustrates another exemplary pressure indicating device 918 that is substantially similar to the aforementioned devices, except an electrical flag arrangement is used. The device 918 includes a case 922 including a first body 928, and a second body 930 that may carry the first body 928, and an indicator 920 carried by the case 922.

The device 918 also includes an electrical flag 925 that may be carried by the first body 928 to provide an electrical signal as an indication of presence or absence of at least a predetermined minimum pressure in the pressurized device. The electrical flag 925 may include a substantially electrical component or device, or an electromechanical device, or the like. For example, the first body 928 may include one or more channels 928a to receive corresponding portions of the flag 925 such that the flag 925 may be removably retained by the first body 928. The flag 925 may include a housing 935 coupled to the first body 928 and including a pocket 931 to receive the indicator 920. The flag 925 may also include a sensor 937 carried by the flag housing 935 and disposed so as to be operable by an end 924 of the indicator 920. The indicator end 924 is projectable out of a portion of the case 922.

More specifically, the sensor 937 may include an actuator 941 that may be displaced by the indicator 920 when the device 918 is pressurized. The sensor 937 may be coupled to a suitable power supply (not shown) and electrical display (not shown) such as a light, remote computer monitor, or the like. The sensor 937 may be a normally open or a normally closed device, such that pressurization of the device 918 may result in presence or absence of a light or signal. In other words, cooperation between the indicator 920 and the sensor 937 may result in a go signal (e.g. light on) or a no-go signal (e.g. light off) or vice-versa. The sensor 937 may be a MICRO SWITCH available from Honeywell, or any other suitable sensing device. As just one of many other possible examples, the sensor 937 may be a proximity sensor or switch, such as a Hall-effect sensor.

The pressure indicating devices of the embodiments of FIGS. 7-20 may be more responsive or more resolute in operation than the device of the embodiment of FIGS. 1-6. In the device of FIGS. 1-6, the indicator pin itself is viewed by an operator to determine the status of the pressure indicating device. Therefore, the more travel of the indicator, the easier it is for an operator to see a change in status of the device. But, as will be discussed below, greater indicator travel equates to more variation in a range of spring force and the point at which a loss or lowering in pressure is indicated becomes less precise. In the embodiment of FIGS. 7-20, a smaller range of spring may be used.

Use of indicator springs having smaller force range allows for less variation between a beginning and an end of travel of the indicator of the pressure indicating device, especially considering component tolerances, seal friction, and spring rate. For example, component stackup or tolerances of various components of the pressure indicating device may allow an exemplary minimum 0.02" of travel of the indicator to trip or release the flag. Because spring rate (K)×travel=spring force range or band, a lower (flatter looking at an x-y curve) spring rate is desirable to achieve a corresponding lower spring force. To compensate for a lower spring rate, a correspondingly larger preload may be applied to the spring. Accordingly, a smaller differential in pressure loss of a pressurized device is required to overcome the spring force to trip the pressure indicating device and indicate a lowering or loss in pressure.

While the forms of the invention herein disclosed constitute exemplary embodiments, many others are possible. For example, the pressure indicating devices described and claimed herein may be used with any pressurized device and not just the exemplary gas springs described herein. For example, the pressure indicating devices may be used with pressurized conduit, tanks, cylinders, actuators, etc. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A pressure indicating device, comprising:
a case including a gas passage;
a movable indicator carried by the case, having an end in fluid communication with the gas passage and having another indicator end, the indicator being movable longitudinally to an extended position when pressure in the gas passage is at least a predetermined minimum pressure and to a retracted position when below the predetermined minimum pressure;
a spring to move the indicator to its retracted position when pressure in the gas passage is below the predetermined minimum pressure;
a flag member carried by the case generally transversely to the longitude of the indicator and movable to first and second positions, the flag member being releasably retained in the first position by engagement with the flag member indicator end when the indicator is in its extended position due to the pressure in the gas passage being at least at the predetermined minimum pressure and movable to the second position upon disengagement by the indicator end when the indicator is in its retracted position due to the pressure in the gas passage being less than the predetermined minimum pressure; and
the flag being yieldably biased toward its second position.

2. The pressure indicating device of claim 1, wherein the case includes a first body to support the indicator end of the indicator, and a second body to carry the first body, receive the end of the indicator, and connect the pressure indicating device to a pressurized device.

3. The pressure indicating device of claim 2, further comprising a spring plate threaded to the indicator, wherein the spring is carried in the case between a portion of the first body and the spring plate.

4. The pressure indicating device of claim 3, further comprising at least one guide member carried by the second body and engageable with the spring plate to prevent rotation thereof.

5. The pressure indicating device of claim 4, wherein the spring plate is rotatably fixed by the guide member, also wherein the indicator and the first body include corresponding torque transmitting features to transmit torque therebetween, such that rotation of the first body relative to the second body causes rotation of the indicator, which rotation causes the spring plate to thread along the indicator away from or toward the spring to allow the spring to extend or to compress the spring, so as to preload the spring to vary the return force applied to the indicator.

6. The pressure indicating device of claim 5, further comprising an intermediate plate carried in the case between the second body and the first body, and at least one set screw carried in the second body and configured to impose a force on the intermediate plate to engage the first and second bodies against relative rotation to deter adjustment of the pressure indicator.

7. The pressure indicating device of claim 1, wherein the flag member in its first position provides a visual indication of the presence of at least the predetermined minimum pressure, and wherein the flag member in its second position provides a visual indication of the absence of at least the predetermined minimum pressure.

8. The pressure indicating device of claim 1, further comprising a spring coupled between the flag member and the case to bias the flag member toward its second position.

9. The pressure indicating device of claim 1, wherein the case includes channels to receive corresponding portions of the flag member, such that the flag member is slidably carried by the case for movement to its first and second positions.

10. The pressure indicating device of claim 1, further comprising a pivot coupled between the case and the flag member, wherein the flag member is pivotably carried by the case for movement to its first and second positions.

11. The pressure indicating device of claim 1, further comprising a cover coupled to the case to protect the flag member.

12. The pressure indicating device of claim 5, wherein a preload of the pressure indicating device is field-adjustable.

13. The pressure indicating device of claim 1, wherein the pressure indicating device further includes a spring plate threaded to the indicator, and the spring is carried in the case between a portion of the case and the spring plate to impose a force on the indicator that opposes a force of pressurized gas that acts on the indicator, wherein at least one of the spring plate or the case includes at least one anti-rotation feature to prevent relative rotation between the spring plate and the case, such that rotation of the indicator causes the spring plate to translate along the indicator in a direction toward or away from the spring to allow the spring to extend or to compress the spring so as to vary the return force on the indicator.

14. The pressure indicating device of claim 13, wherein the pressure indicating device is resistant to tampering with a preload of the pressure indicating device.

15. The pressure indicating device of claim 1, wherein the pressure indicating device case includes a first body to support the indicator end of the indicator, a second body to carry the first body, receive a second end of the indicator, and connect the pressure indicating device to a pressurized device, and a sealing plate axially disposed between the first and second bodies.

16. The pressure indicating device of claim 1 wherein the flag member has a pocket in which the indicator end of the indicator is received when the indicator is in its extended position to releasably retain the flag member in its first position.

17. The pressure indicating device of claim 1 which also comprises an indicia associated with the flag member and indicating the gas pressure is less than the predetermined minimum and the indicia is exposed to view when the flag member is in its second position and is covered from view by the flag member when the flag member is in its first position.

* * * * *